(12) United States Patent
Miyajima

(10) Patent No.: US 8,452,103 B2
(45) Date of Patent: *May 28, 2013

(54) SCENE MATCHING REFERENCE DATA GENERATION SYSTEM AND POSITION MEASUREMENT SYSTEM

(75) Inventor: Takayuki Miyajima, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 218 days.

This patent is subject to a terminal disclaimer.

(21) Appl. No.: 13/020,304

(22) Filed: Feb. 3, 2011

(65) Prior Publication Data

US 2011/0243455 A1 Oct. 6, 2011

(30) Foreign Application Priority Data

Mar. 31, 2010 (JP) ................................ 2010-084690

(51) Int. Cl.
G06K 9/46 (2006.01)
(52) U.S. Cl.
USPC ...................................................... 382/190
(58) Field of Classification Search
None
See application file for complete search history.

(56) References Cited

U.S. PATENT DOCUMENTS

| 6,154,152 | A | 11/2000 | Ito | |
|---|---|---|---|---|
| 2010/0191391 | A1* | 7/2010 | Zeng | 701/1 |
| 2010/0231718 | A1* | 9/2010 | Nakamori et al. | 348/148 |
| 2010/0266161 | A1* | 10/2010 | Kmiecik et al. | 382/103 |
| 2010/0329510 | A1* | 12/2010 | Schmid | 382/103 |
| 2011/0221901 | A1* | 9/2011 | Bai et al. | 348/148 |

FOREIGN PATENT DOCUMENTS

| EP | 0 921 509 A2 | 6/1999 |
|---|---|---|
| EP | 1 975 565 A2 | 10/2008 |
| JP | A-2007-108043 | 4/2007 |

OTHER PUBLICATIONS

Aug. 20, 2012 European Search Report issued in EP 11 15 3983.

* cited by examiner

*Primary Examiner* — Vikkram Bali
(74) *Attorney, Agent, or Firm* — Oliff & Berridge, PLC

(57) ABSTRACT

A scene matching reference data generation system inputs a set of probe data. The set of the probe data includes captured images sequentially obtained by a plurality of probe cars and the vehicle positions of the probe cars. The system temporarily stores the captured images, evaluates accuracy reliability degrees of the image-capturing positions of the captured images, and assigns the accuracy reliability degrees to the captured images. The system selects, as a plurality of processing target captured images, a plurality of the captured images having accuracy reliability degrees equal to or higher than a first predetermined degree, extracts image feature points from the selected processing target captured images, and generates image feature point data based on the extracted image feature points. The system generates reference data for scene matching by associating the generated image feature point data with a reference image-capturing position corresponding to the generated image feature point data.

9 Claims, 8 Drawing Sheets

CAPTURED IMAGE

FIG. 7A
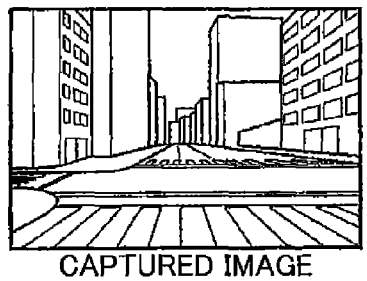
CAPTURED IMAGE
FIG. 7B
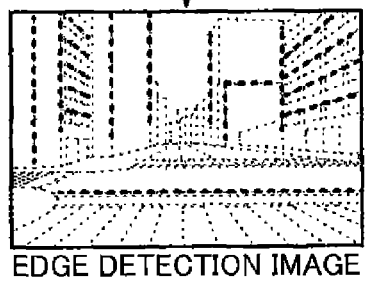
EDGE DETECTION IMAGE
FIG. 7C
IMPORTANCE DEGREE LAYER
FIG. 7D
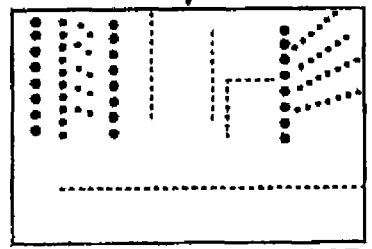
EDGE DETECTION IMAGE IN WHICH WEIGHT COEFFICIENTS ARE ASSIGNED
FIG. 7E
ADJUSTMENT COEFFICIENT LAYER
FIG. 7F
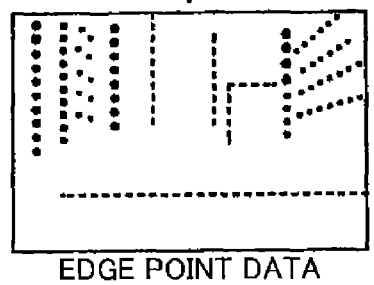
EDGE POINT DATA great/circle/US 8,452,103 B2

SCENE MATCHING REFERENCE DATA GENERATION SYSTEM AND POSITION MEASUREMENT SYSTEM

INCORPORATION BY REFERENCE

The disclosure of Japanese Patent Application No. 2010-084690 filed on Mar. 31, 2010 including the specification, drawings and abstract is incorporated, herein by reference in its entirety.

BACKGROUND OF THE INVENTION

1. Field of the Invention

The invention relates to a scene matching reference data generation system, and a position measurement system that uses reference data generated by the scene matching reference data generation system.

2. Description of the Related Art

In car navigation apparatuses, a method in which information obtained from sensors such as a gyro sensor and a geomagnetic sensor is used (an autonomous navigation method), a method in which signals from GPS satellites are used, or the combination of the autonomous navigation method and the method in which signals from GPS satellites are used has been employed as a method of calculating the current position of a vehicle. Further, for example, a position measurement apparatus described in Japanese Patent Application Publication No. 2007-108043 (JP-A-2007-108043) is known as a position measurement apparatus configured to accurately calculate the current position (refer to the paragraphs 0009 to 0013, and FIG. 1). In the position measurement apparatus, first, a tentative current position is obtained using the signals from navigation satellites, and the like. Then, the coordinates of a feature point (a vehicle coordinate system feature point) of a road marking in a coordinate system (a vehicle coordinate system) with respect to the tentative current position are calculated using the captured image of a scene ahead of the vehicle. Then, the current position of the vehicle is calculated using the calculated vehicle coordinate system feature point and the stored coordinates of the feature point of the road marking (i.e., the coordinates shown in the world coordinate system). In the position measurement apparatus, it is possible to accurately calculate the current position, even when the position measured using the signals transmitted from the navigation satellites and/or signals transmitted from various sensors includes an error.

SUMMARY OF THE INVENTION

In the position measurement apparatus described in Japanese Patent Application Publication No. 2007-108043 (JP-A-2007-108043), the space coordinates of the feature point of the road marking on a road are obtained using a stereo image, and the latitude and the longitude of the road marking having the feature point are obtained from the database of road marking information. Thus, the current position of the vehicle is calculated using the coordinates obtained using the latitude and the longitude of the road marking. Therefore, the position measurement apparatus cannot be used in an area where there is no road marking. Also, because it is necessary to compute the space coordinates of the feature point recognized through image processing, the apparatus is required to have high computing ability, which results in an increase in cost.

Thus, a method, in which a scenic image recognition technology is used, is conceivable as a positioning method that can be used on a road or a specific site where there is no road marking, and that does not require calculation of the space coordinates of each feature point. When the scenic image recognition is performed, a large number of sheets of reference image data (reference data) are required. Therefore, ordinary vehicles are used to obtain captured images for creating the set of the reference data. That is, it is conceivable to apply the concept regarding probe cars to generation of the set of the reference data. Among the captured images collected by the ordinary vehicles (the probe cars), there are the captured image associated with an image-capturing position (i.e., a position of the probe car at which the captured image is obtained) that is highly accurate, and the captured image associated with the image-capturing position that is less accurate. Therefore, the captured images for creating the set of the reference data, which are collected from a large number of probe cars, need to be appropriately treated.

A first aspect of the invention relates to a scene matching reference data generation system including a data input unit to which a set of probe data is input, wherein the set of the probe data includes captured images sequentially obtained by a plurality of probe cars each of which has a function of calculating a vehicle position, and the vehicle positions of the probe cars, as image-capturing positions of the captured images; a temporary storage unit in which the captured images included in the set of the probe data are temporarily stored; an accuracy reliability degree evaluation unit that evaluates accuracy reliability degrees of the image-capturing positions of the captured images stored in the temporary storage unit, and assigns the accuracy reliability degrees to the captured images; a processing target data selection unit that selects, as a plurality of processing target captured images, a plurality of the captured images with the accuracy reliability degrees equal to or higher than a first predetermined degree, from among the captured images stored in the temporary storage unit; an image feature point data generation unit that extracts image feature points from the plurality of the processing target captured images, and generate image feature point data based on the image feature points extracted from the plurality of the processing target captured images; and a reference data generation unit that generates the reference data used for scene matching to recognize an image of a scene viewed from a vehicle, by associating the image feature point data with a reference image-capturing position corresponding to the image feature point data.

According to the above-described first aspect, the set of the probe data obtained by the various probe cars are taken in, and the plurality of the captured images with the accuracy reliability degrees equal to or higher than the first predetermined degree are selected as the processing target captured images, based on the results of the evaluation on the accuracy reliability degrees of the image-capturing positions of the captured images. The reference data is generated by associating the image feature point data generated based on the image feature amounts calculated from the processing target captured images, with the reference image-capturing position corresponding to the image feature point data. The accuracies of the vehicle positions, that is, the accuracies of the image-capturing positions vary depending on the performance of the vehicle position calculation functions provided in the probe cars, and the travel situations in which the probe cars are traveling. Therefore, the accuracy reliability degrees of the image-capturing positions are evaluated, and the captured images with high accuracy reliability degrees are selected as the processing target captured images. Further, the image feature point data is generated based on the image feature amounts calculated from the selected captured images. The image feature point data thus generated is stable data in which the image feature amounts are evenly distributed. As a result, the reference data generated from the image feature point data is suitable for scene matching.

A second aspect of the invention relates to a position measurement system including a reference data database in which the reference data generated by the scene matching reference data generation system according to the first aspect is stored; a captured image processing unit that extracts image feature points from a captured image obtained by capturing an image of a scene viewed from a vehicle, generates image feature point data for each captured image using the extracted image feature points, and outputs the generated image feature point data as data for matching; and a scene matching unit that performs matching between the reference data extracted from the reference data database and the data for matching, and determines a position of the vehicle based on the image-capturing position associated with the reference data that matches the data for matching.

According to the above-described second aspect, the reference data useful for the scene matching is used as described above. Therefore, it is possible to appropriately determine the vehicle position.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 7A to 7F are schematic diagram schematically showing a process during which image feature point data is generated from a selected captured image;

DETAILED DESCRIPTION OF EMBODIMENTS

Figure 1:
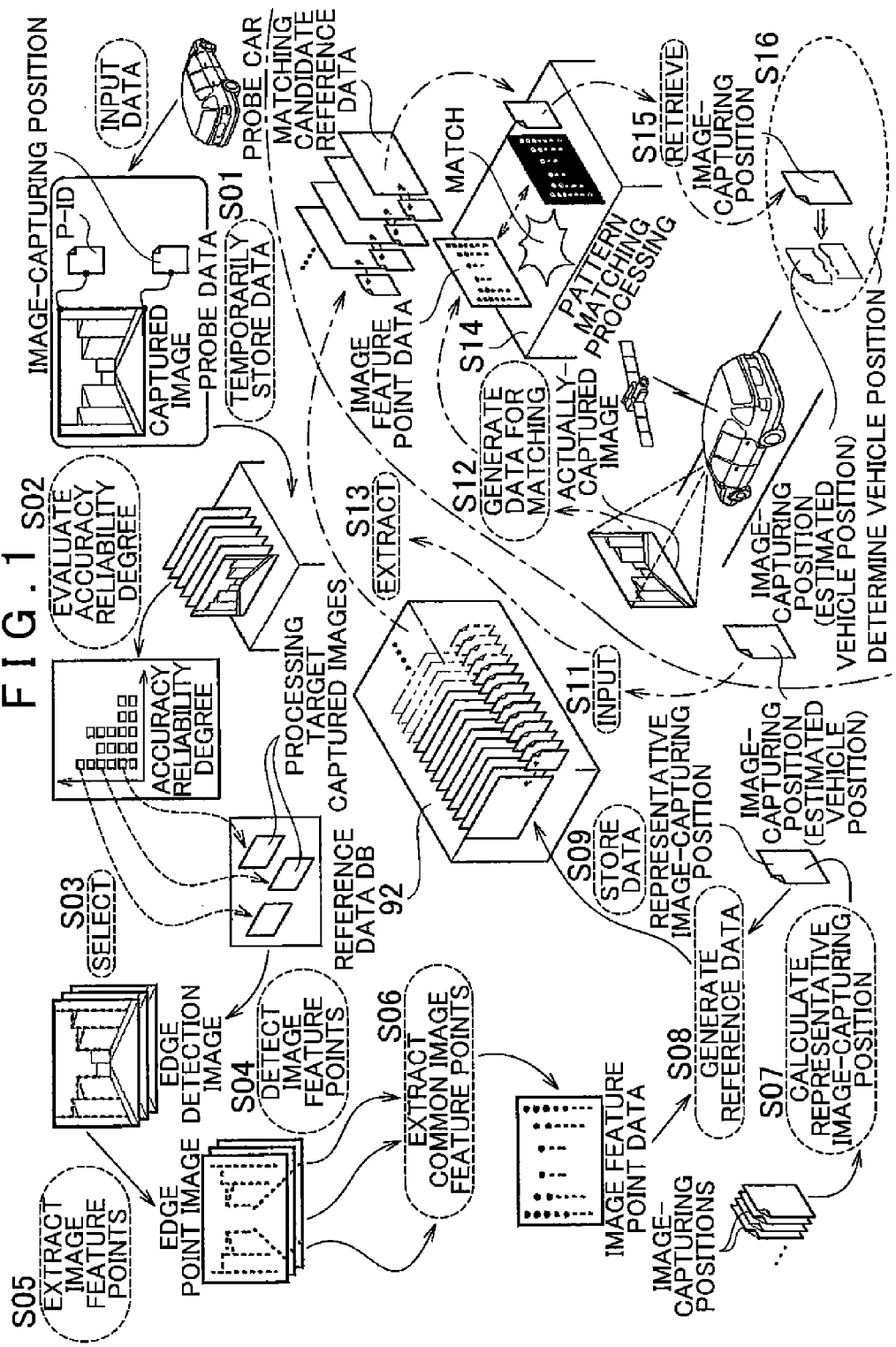
FIG. 1 is a schematic diagram used to explain the basic concept of an example of generation of reference data by a scene matching reference data generation system according to an embodiment of the invention, and a procedure for position measurement in which a vehicle position is determined through matching processing using the reference data.

Hereinafter, an embodiment of the invention will be described in detail with reference to the drawings. FIG. 1 schematically shows the basic concept of an example of creation of reference data by a scene matching reference data generation system (hereinafter, may be simply referred to as "reference data generation system"), and a procedure for position measurement in which a vehicle position is determined through matching processing using the reference data. A reference data database (hereinafter simply referred to as reference data DB) 92 used for scene matching is created using reference data generated by the scene matching reference data generation system according to the embodiment of the invention. First, a procedure for creating the reference data DB 92 will be described.

As shown in FIG. 1, captured images are obtained by capturing images of scenes viewed from a plurality of probe cars during travel. Each of the captured images is associated with an image-capturing position (substantially the vehicle position of the probe car at the time of image capturing) and a probe car ID (hereinafter, simply referred to as "P-ID") to generate probe data, and the generated probe data is input. The probe car ID is used for identifying the probe car. A set of the probe data whose image-capturing positions are included in a predetermined first image-capturing position region is temporarily stored in a working memory as a first processing group (step 01). The first image-capturing position region is set so that the image-capturing positions included in the first image-capturing position region is regarded as being substantially the same (for example, the first image-capturing position region is set to a range of 1 m). Next, the accuracy reliability degrees of the image-capturing positions of the captured images are evaluated using the set of the probe data stored in the working memory, and the accuracy reliability degrees are assigned to the captured images (step 02). The accuracy reliability degree is obtained based on, for example, the vehicle position detection performance of a car navigation apparatus or the like provided in each probe car, and a distance traveled by the probe car after the vehicle position is corrected by recognizing a specific area such as an intersection or a curved road. The captured images, to which the accuracy reliability degrees have been assigned, are sorted according to the accuracy reliability degrees. The captured images with the accuracy reliability degrees equal to or higher than a first predetermined degree are selected as processing target captured images, and a set of the probe data including the processing target captured images is selected as a set of the processing target data (step 03). Alternatively, a predetermined number of the captured images with high accuracy reliability degrees sorted in descending order of the accuracy reliability degree may be selected as the processing target captured images. Image feature amounts are calculated from the processing target captured images. Processing of calculating the image feature amounts is image processing for obtaining feature points and feature point groups for performing matching on the captured image. Typical processing of calculating the image feature amounts is edge detection processing using an outline detection operator. Edge detection images are obtained through the edge detection processing (step 04). The image feature points determined to be useful for the matching processing are extracted from multiple image feature points, that is, edge points included in the edge detection images (step 05). Image feature points that are common to the plurality of the processing target captured images (common image feature points) are extracted from the image feature point groups obtained from the plurality of the processing target captured images, and image feature point data including the common image feature point group is generated (step 06). Further, a representative image-capturing position (an example of a reference image-capturing position) that is the representative of the image-capturing positions in the above-described first image-capturing position region is calculated in processing different from the above-described processing, using the image-capturing positions in the group of the processing target captured images whose image-capturing positions are included in the first image-capturing position region (that is, the group of the captured images that are regarded as the captured images having the same image-capturing position) (step 07). The representative image-capturing position may be calculated, by simply averaging the image-capturing positions. When the accuracies of the image-capturing positions are known, the representative image-capturing position may be calculated by a weighted average calculation method using the accuracies for performing weighting. The representative image-capturing position may be calculated by other various statistical calculation methods. Next, the reference data is generated by associating the image feature point data with the representative image-capturing position (step 08). A database of the generated reference data is created to be searchable using the representative image-capturing position as a search condition. That is, the reference data is stored in the reference data DB 92 so that the reference data is used as the reference data for the scene matching, for example, the pattern for pattern matching (step 09).

Next, a procedure for determining the position of the vehicle (vehicle position) while the vehicle is actually traveling using the reference data DB 92 created by the above-described procedure will be described. As shown in FIG. 1, first, an actually-captured image, which is obtained by capturing an image of a scene using the vehicle-mounted camera, and the image-capturing position of the actually-captured image, which is used to extract the reference data from the reference data DB 92, is input (step 11). The image-capturing position input in this step is an estimated vehicle position that is estimated using, for example, a GPS measurement unit. Data for matching, which is the image feature point data, is generated from the input captured image, through the step 04 to the step 06 described above (step 12). Simultaneously, a set of the reference data regarding the image-capturing position (the estimated vehicle position) and the reference data regarding positions ahead of, and behind the image-capturing position (the estimated vehicle position) is extracted as a matching candidate reference dataset, using the input image-capturing position (the estimated vehicle position) as the search condition (step 13). Each reference data included in the extracted matching candidate reference dataset is set as the pattern, and the processing of pattern matching between each pattern and the generated data for matching is performed as the scenic image recognition (step 14). When the reference data, which is set as the pattern, matches the generated data for matching, the image-capturing position associated with the reference data that matches the generated data for matching is retrieved (step 15). The retrieved image-capturing position is determined to be a formal vehicle position, instead of the estimated vehicle position (step 16).

Figure 2:
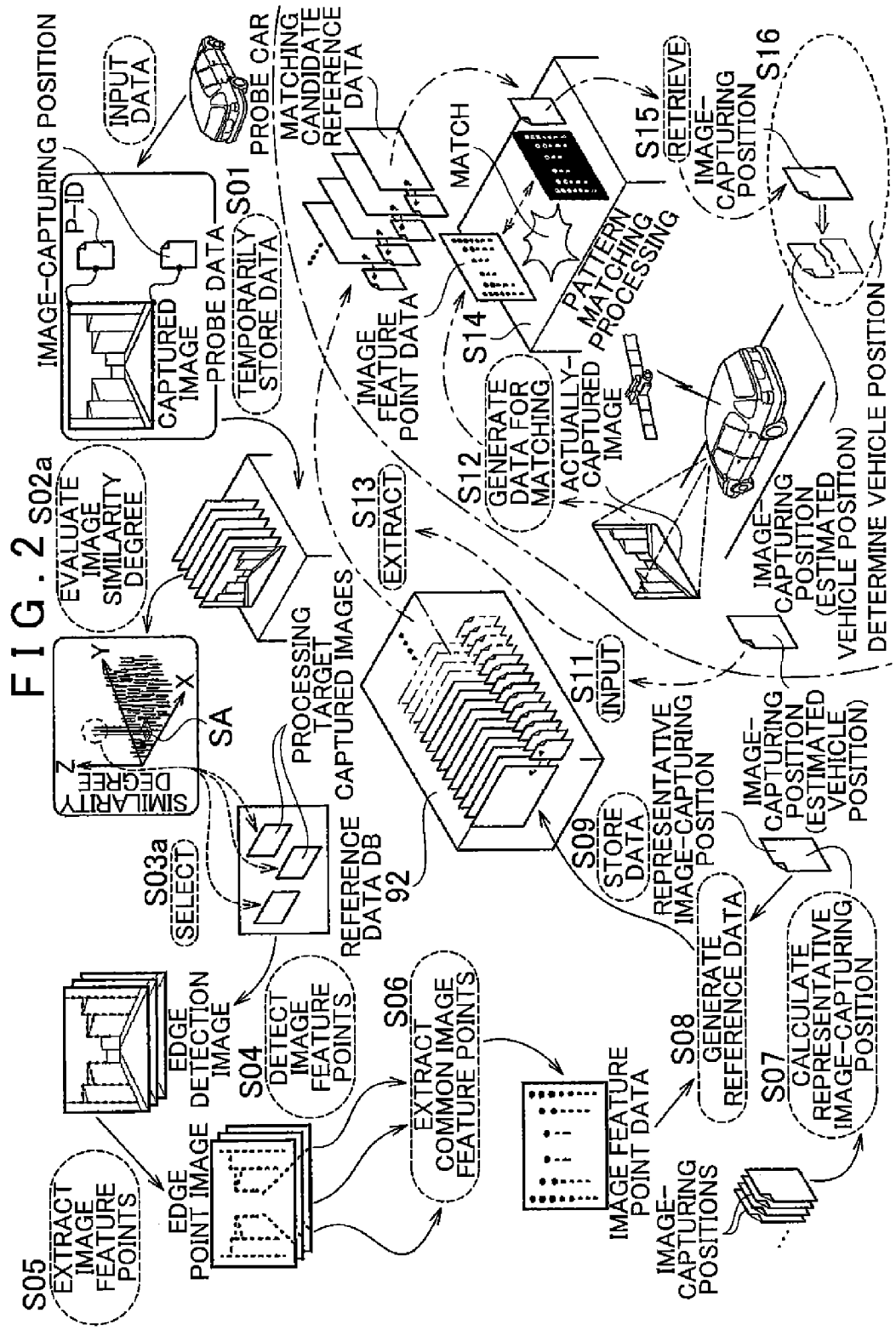
FIG. 2 is a schematic diagram used to explain the basic concept of another example of the generation of the reference data by the scene matching reference data generation system according to the embodiment of the invention, and a procedure for position measurement in which the vehicle position is determined through the matching processing using the reference data.

Next, the basic concept of another example of the generation of the reference data by the scene matching reference data generation system according to the embodiment of the invention will be described with reference to FIG. 2. The procedure for position measurement in which the vehicle position is determined through the matching processing using the created reference data is the same as that in FIG. 1, and therefore, the description thereof will be omitted. As shown in FIG. 2, in this example as well, the captured images are obtained by capturing images of scenes viewed from a plurality of probe cars during travel. Each of the captured images is associated with the image-capturing position and P-ID used for identifying the probe car, and thus, the probe data is generated and the generated probe data is input. A set of the probe data whose image-capturing positions are included in a predetermined second image-capturing position region is temporarily stored in the working memory as a second processing group (step 01). The second image-capturing position region is set larger than the first image-capturing position region, and is set sufficiently larger than the error range of the image-capturing position with low accuracy. Then, the image similarity degrees of the captured images stored in the working memory are evaluated, and the image similarity degrees are assigned to the captured images (step 02a). The captured images, to which the image similarity degrees have been assigned, are plotted in a three-dimensional graph in which a Z-axis indicates the image similarity degree, an X-axis indicates the X-coordinate of the image-capturing position, and a Y-axis indicates the Y-coordinate of the image-capturing position. In the three-dimensional graph, an X-Y region, in which the captured images with high image similarity degrees are concentrated, is regarded as a selection region SA. The captured images located in the selection region SA are selected as the processing target captured images. A set of the probe data including the processing target captured images is selected as a set of the processing target data (step 03a). Alternatively, the captured images with the image similarity degrees equal to or higher than a second predetermined degree may be selected as the processing target captured images. The image feature amounts are calculated from the processing target captured images selected as the set of the processing target data. In this example, processing of calculating the image feature amounts is edge detection processing using an outline detection operator. The edge detection images are obtained through the edge detection processing (step 04). The image feature points determined to be useful for the matching processing are extracted from multiple image feature points, that is, edge points included in the edge detection images (step 05). Image feature points that are common to the plurality of the processing target captured images (common image feature points) are extracted from the image feature point groups obtained from the plurality of the processing target captured images, and image feature point data including the common image feature point group is generated (step 06). In this example as well, the representative image-capturing position that is the representative of the image-capturing positions in the above-described selection region SA is calculated in processing different from the above-described processing, using the image-capturing positions in the group of the processing target captured images whose image-capturing positions are included in the selection region SA (step 07). Next, the reference data is generated by associating the image feature point data with the representative image-capturing position (step 08). The database of the generated reference data is created to be searchable using the representative image-capturing position as a search condition. That is, the reference data is stored in the reference data DB 92 so that the reference data is used as the reference data for the scene matching, for example, the pattern for the pattern matching (step 09).

Figure 3:
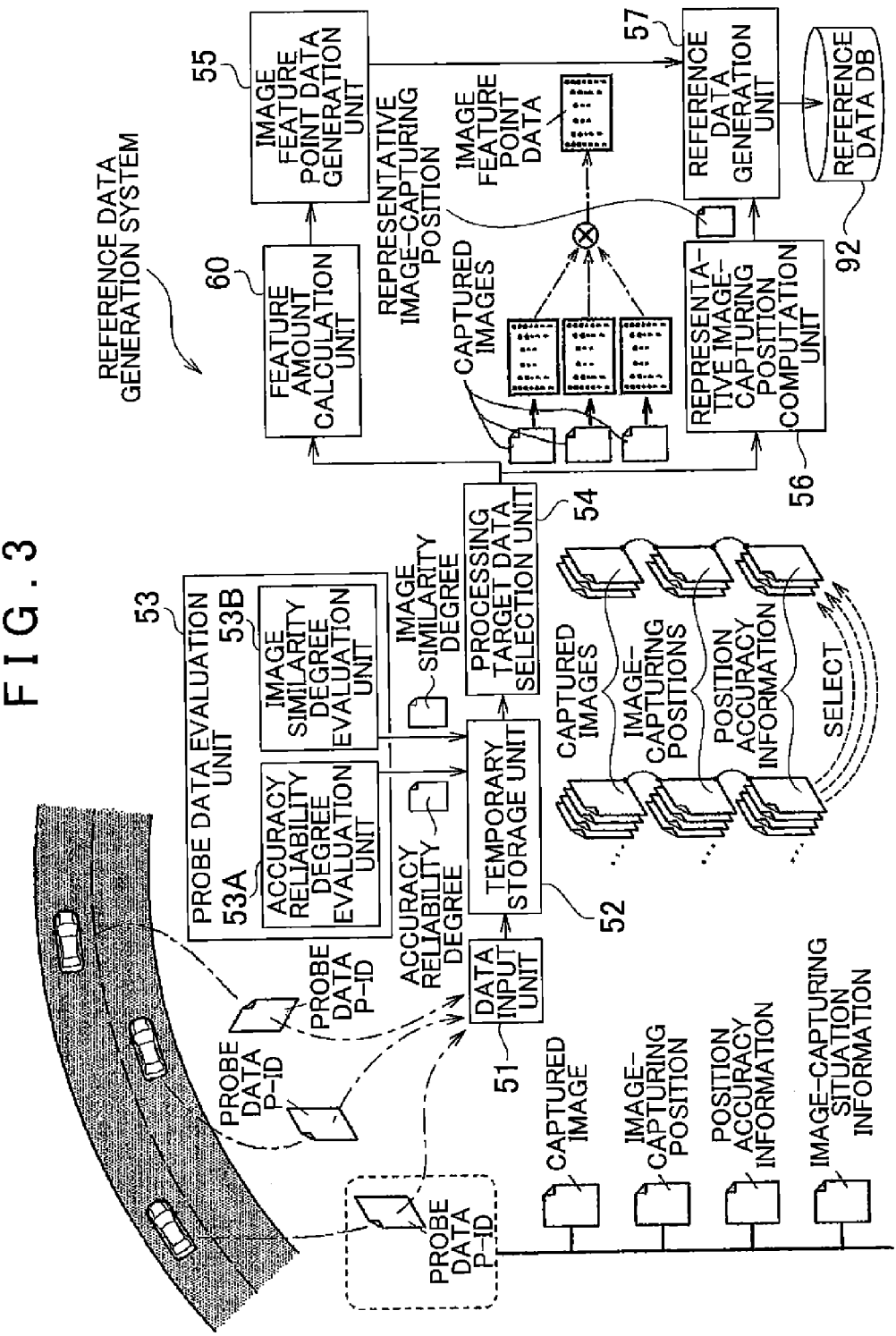
FIG. 3 is a functional block diagram showing main functions of the scene matching reference data generation system according to the embodiment of the invention.

Next, an example of the reference data generation system according to the embodiment of the invention, which creates the reference data from the captured images based on the above-described basic concept, will be described with reference to a functional block diagram in FIG. 3. The reference data generation system is installed in an external facility such as a data processing center. The reference data generation system includes a data input unit 51, a temporary storage unit 52, a probe data evaluation unit 53, a processing target data selection unit 54, a feature amount calculation unit 60, an image feature point data generation unit 55, a representative image-capturing position calculation unit 56, and a reference data generation unit 57. Each of the functions may be implemented by hardware, software, or combination of hardware and software.

The probe data, which are generated in each probe car at intervals of a predetermined time, and/or at intervals of a predetermined travel distance, are input to the data input unit 51. Each probe car is an ordinary vehicle that has contracted with a company that generates the reference data. The captured image obtained by capturing an image of a scene using a camera (a front camera in this case) provided in the vehicle while the vehicle is normally traveling, and the image-capturing position at the time of image capturing (i.e., the vehicle position of the probe car) are transmitted, as the probe data, to the reference data generation system in a batch manner or in real time. In the embodiment, the probe data further includes position accuracy information that is information regarding the accuracy of the image-capturing position, and image-capturing situation information. Each probe data includes the P-ID that makes it possible to identify the corresponding probe car and the probe data. A set of the probe data can be divided into groups, using the P-IDs thereof.

The position accuracy information includes the performance of the position calculation function of a navigation apparatus that calculates the vehicle position used as the image-capturing position, and factors that influence the calculation of the vehicle position (for example, a distance traveled by the vehicle from a vehicle position that was confirmed, and the possibility that the vehicle slips or travels in a zigzag manner). The image-capturing situation information is information that is additionally used when the reference data is generated from the captured images. The image-capturing situation information is information indicating that a specific subject is included in the captured image. Examples of the specific subject include objects that define a traveling lane in which the vehicle travels, such as a guide rail and a groove at a road shoulder, moving objects such as a nearby traveling vehicle, an oncoming vehicle, a bicycle, and a pedestrian, and scenic objects that are the features of a mountainous area, a suburban area, an urban area, a high-rise building area, and the like, such as a mountain and a building. In the embodiment, the contents of the image-capturing situation information include traveling lane data $D_L$, moving object data $D_O$, and area attribute data $D_A$. The traveling lane data $D_L$ is data that shows a region of the traveling lane, and a region outside a road, in the captured image. The traveling lane data $D_L$ is obtained based on the result of recognition of white lines, a guide rail, and a safety zone. The white lines, the guide rail, and the safety zone are recognized through the image processing performed on the captured image. The moving object data $D_O$ is data that shows a region where a moving object near the vehicle exists in the captured image. The moving object near the vehicle is recognized by a vehicle-mounted sensor that detects an obstacle, such as a radar. The area attribute data $D_A$ is data that shows the type of an image-capturing area in which the captured image is obtained by capturing the image, that is, an area attribute of the image-capturing area. Examples of the area attribute include a mountainous area, a suburban area, an urban area, and a high-rise building area. The type, that is, the area attribute of the image-capturing area is recognized based on the vehicle position when the captured image is obtained by capturing the image, and map data.

The set of the probe data, which is divided into groups according to the image-capturing positions, is stored in the temporary storage unit 52. The probe data evaluation unit 53 includes an accuracy reliability degree evaluation unit 53A and an image similarity degree evaluation unit 53B. The accuracy reliability degree evaluation unit 53A evaluates the accuracy reliability degrees of the image-capturing positions of the captured images each of which is stored in the temporary storage unit 52 as part of the probe data, and assigns the accuracy reliability degrees to the corresponding captured images. The image similarity degree evaluation unit 53B evaluates the image similarity degrees of the captured images each of which is stored in the temporary storage unit 52 as part of the probe data, and assigns the image similarity degrees to the corresponding captured images. The processing target data selection unit 54 has a function of retrieving the first processing group from the set of the probe data stored in the temporary storage unit 52, and selecting a plurality of the captured images that satisfy a selection condition regarding the accuracy reliability degrees or a plurality of the captured images that satisfy a selection condition regarding the image similarity degrees, from among the plurality of the captured images in the retrieved first processing group, as the processing target captured images, and selecting a set of the probe data including the processing target captured images as a set of the processing target data. The selected processing target captured images are transmitted to functional units in a latter-stage group. In the embodiment, in the probe data evaluation unit 53, an accuracy reliability degree evaluation mode or an image similarity degree evaluation mode is selected and performed. In the accuracy reliability degree evaluation mode, the accuracy reliability degree evaluation unit 53A evaluates the accuracy reliability degrees of the image-capturing positions. In the image similarity degree evaluation mode, the image similarity degree evaluation unit 53B evaluates the image similarity degrees of the captured images. In the processing target data selection unit 54, an accuracy reliability degree mode or an image similarity degree mode is selected according to the evaluation mode performed in the probe data evaluation unit 53. In the accuracy reliability degree mode, the selection condition regarding the accuracy reliability degrees is selected and the processing target captured images are selected (a set of the processing target data is selected) using the condition regarding the accuracy reliability degrees. In the image similarity degree mode, the selection condition regarding the image similarity degrees is selected, and the processing target captured images are selected (a set of the processing target data is selected) using the condition regarding the image similarity degrees. For example, it is preferable to employ a method in which the accuracy reliability degree mode is performed first, and if it is determined that a set of the probe data with sufficiently high accuracy reliability degrees is not input, the mode is switched to the image similarity degree mode to perform processing. For example, when the number of the captured images with the accuracy reliability degrees equal to or higher than a third predetermined degree among the captured images stored in the temporary storage unit 52 is equal to or smaller than a predetermined value, the mode of the processing target data selection unit 54 may be switched from the accuracy reliability degree mode to the image similarity degree mode.

Figure 4:
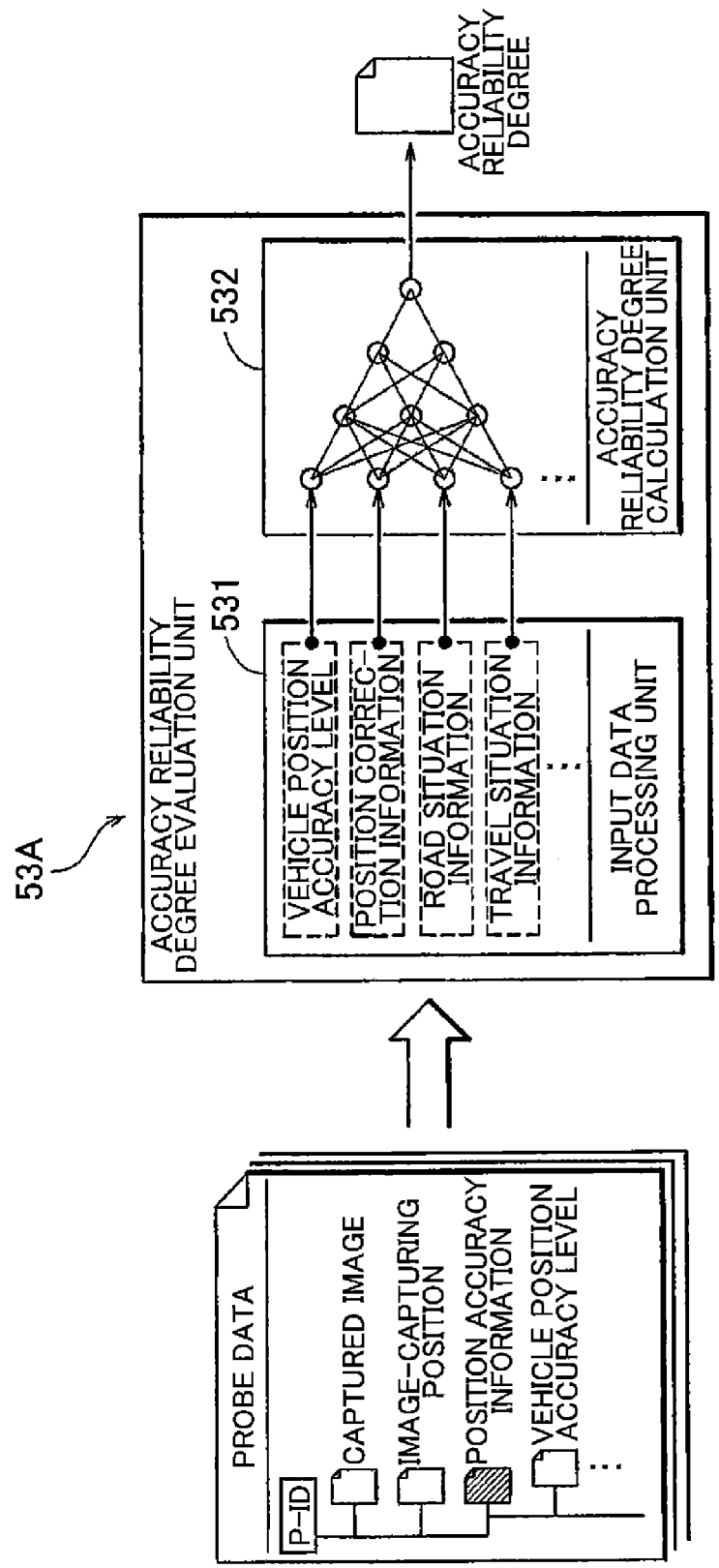
FIG. 4 is a schematic diagram showing processing functions of an accuracy reliability degree evaluation unit, and a processing flow.

As shown in FIG. 4, in the accuracy reliability degree evaluation mode, the accuracy reliability degree evaluation unit 53A retrieves the position accuracy information from the probe data stored in the temporary storage unit 52. Data included in the position accuracy information is input to the accuracy reliability degree evaluation unit 53A, and the accuracy reliability degree, which is the reliability degree regarding the accuracy of the calculation of the image-capturing position in the probe data, is output from the accuracy reliability degree evaluation unit 53A. In the embodiment, the data input to the accuracy reliability degree evaluation unit 53A includes information indicating the accuracy of the vehicle position of each probe car, and information indicating a travel situation in which each probe car is traveling. Examples of the information indicating the accuracy of the vehicle position of each probe car include information on a vehicle position accuracy level that indicates the performance of the vehicle position calculation function provided in each probe car, and position correction information that indicates a distance traveled by each probe car from a vehicle position that was confirmed at an intersection or on a curved road. Examples of the information indicating the travel situation in which each probe car is traveling include the number of points at which the vehicle position can be corrected on a road on which the probe car is traveling, road situation information that indicates whether the probe car is traveling on a road on which vehicles are likely to slip or likely to travel in a zigzag manner, and driving situation information that indicates whether a driver is driving the probe car in a manner that influences an error in the calculation of the vehicle position. The input data is quantified or normalized by an input data processing unit 531, and then, transmitted to an accuracy reliability degree calculation unit 532 that calculates the accuracy reliability degree. The calculation method used in the accuracy reliability degree calculation unit 532 is not limited in the invention. However, because one output value is derived from a plurality of input values in different dimensions, it is preferable to employ a rule base or a neural network. Also, in order to increase the speed of the calculation, a table indicating the input values and the output values may be created. In this case, the accuracy reliability degree evaluation unit 53A includes an accuracy reliability degree table in which the accuracy reliability degrees of the image-capturing positions of the captured images are set according to information that indicates the accuracies of the vehicle positions of the probe cars, and information that indicates the travel situations in which the probe cars are traveling. The accuracy reliability degree evaluation unit 53A evaluates the accuracy reliability degrees of the captured images using the accuracy reliability degree table. The processing target data selection unit 54 selects, as the processing target captured images, the captured images whose accuracy reliability degrees output from the accuracy reliability degree calculation unit 532 satisfy the selection condition regarding the accuracy reliability degrees, in the accuracy reliability degree mode. It has been found that the factor that influences the accuracy reliability degree, such as the performance of the vehicle position calculation function provided in the probe car, depends on the type of the probe car (or the identification code of the probe car), and the travel road situation that influences the accuracy reliability degree depends on the image-capturing position. Accordingly, the accuracy reliability degree table may be created to output the accuracy reliability degrees using the types of the probe cars and the estimated vehicle positions as input parameters.

When the probe car itself has a function of calculating the accuracy reliability degree described above, the probe data may include the accuracy reliability degree. In this case, the accuracy reliability degree evaluation unit 53A may have only the function of retrieving the accuracy reliability degree from the probe data.

Also, the calculated position of a vehicle that has a function of calculating the vehicle position with high accuracy and the calculated position of an ordinary vehicle that has an ordinary function of calculating the vehicle position may be compared to each other to obtain a difference value between the calculated positions in advance, and data for obtaining the accuracy reliability degrees of the vehicle positions may be created in advance using the difference values obtained while the vehicles are traveling. On the basis of the data, the accuracy reliability degree table may be created to output the accuracy reliability degrees using the vehicle positions (image-capturing positions) as the input values. In this case, it is possible to easily obtain the accuracy reliability degrees. This accuracy reliability degree table may be also included in the accuracy reliability degree evaluation unit 53A in the embodiment of the invention.

Figure 5:
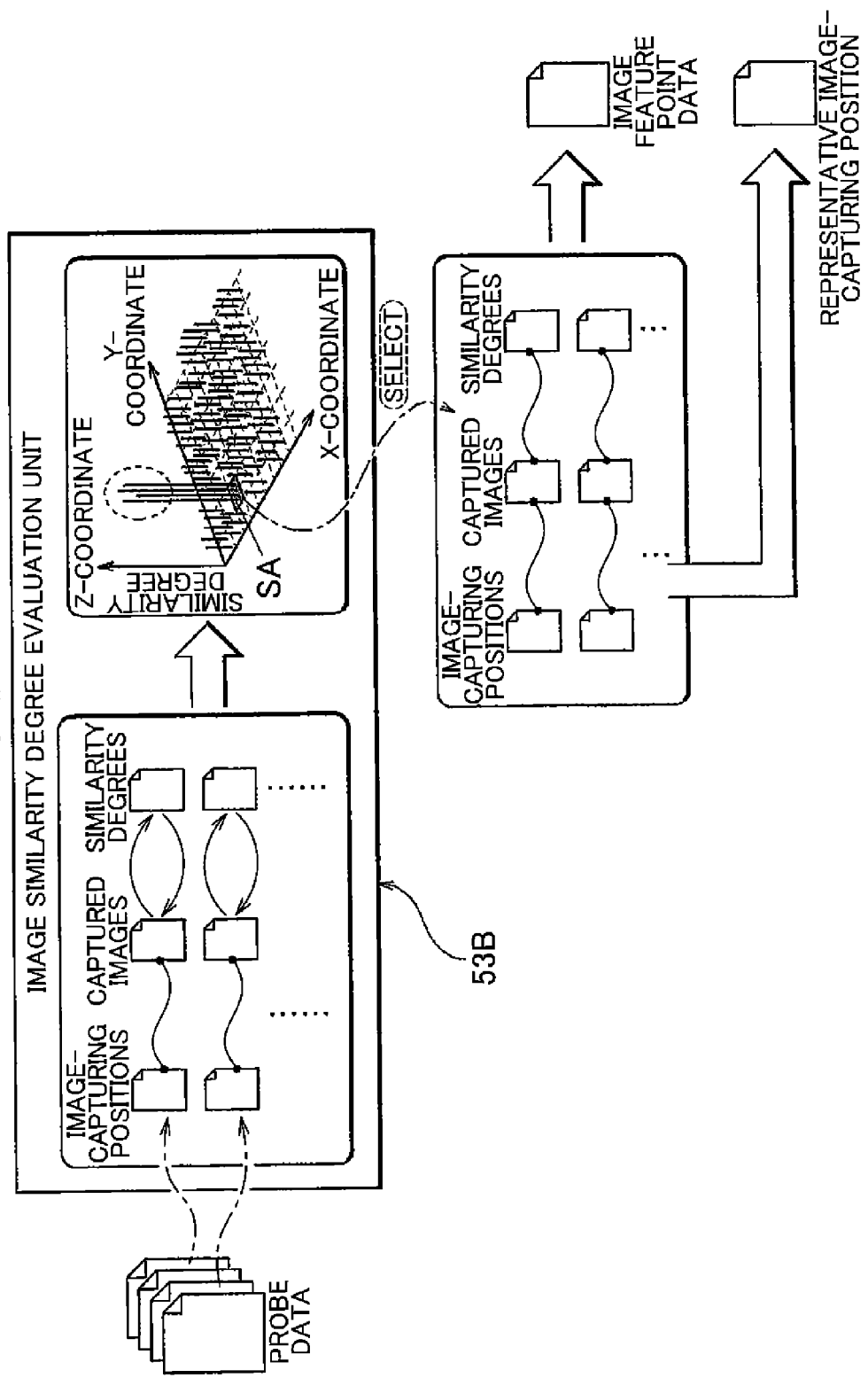
FIG. 5 is a schematic diagram showing processing functions of an image similarity degree evaluation unit, and a processing flow.

As shown in FIG. 5, in the image similarity degree evaluation mode, the image similarity degree evaluation unit 53B retrieves the set of the probe data in the second processing group, from the set of the probe data stored in the temporary storage unit 52. The image similarity degree evaluation unit 53B calculates the image similarity degrees between the captured images in the set of the retrieved probe data and, for example, an average captured image, and assigns the image similarity degrees to the captured images. Further, the captured images, to which the image similarity degrees have been assigned, are plotted in a three-dimensional graph in which the Z-axis indicates the image similarity degree, the X-axis indicates the X-coordinate of the image-capturing position, and the Y-axis indicates the Y-coordinate of the image-capturing position. Thus, it is possible to statistically estimate the actual image-capturing positions of the set of the probe data in the second processing group stored in the temporary storage unit 52. For example, the processing target data selection unit 54 may use, as the selection region SA, a region in which the captured images (the set of the probe data) with high image similarity degrees are concentrated, and may select the captured images whose image-capturing positions are included in the selection region SA, as the processing target captured images. Various known methods may be used as the method of calculating the image similarity degree in the image similarity degree evaluation unit 53B. First, an index value that represents the feature of each captured image may be obtained, and then, the image similarity degree may be obtained based on the index value. Hereinafter, examples of the index value will be described.

(1) Method Using the Average Value of Pixel Values

First, the average value of pixel values for each color component in the entire image is obtained. Then, the three-dimensional Euclidean distance between the average values of the pixel values for each color component in the images to be compared with each other is obtained. The obtained three-dimensional Euclidean distance is normalized.

(2) Method Using Image Histograms

First, a luminance histogram for each of color components in the image is generated. Then, the square-root of sum of squares of differences between values at a plurality of levels in the luminance histograms for the images to be compared to each other is obtained. The sum of the square roots obtained for the color components is obtained. The obtained sum is normalized.

(3) Method Using Differences Between Pixel Values at the Same Positions

When the resolutions of the images to be compared to each other are made equal to each other, the square-root of sum of squares of differences between pixel values in the images at the same positions is obtained. The obtained square-root is normalized.

(4) Method Using Spatial Frequency Histograms for the Images

First, Fourier-transformation is performed on spatial frequencies in the image to generate a frequency-luminance histogram. Then, the square-root of sum of squares of differences between values at a plurality of levels in the frequency-luminance histograms for the images to be compared with each other. The obtained square-root is normalized.

In addition to the above-described methods, other methods of calculating the image similarity degree using various image characteristics may be employed. Thus, the invention is not limited to a specific method of calculating the image similarity degree. The method of calculating the image similarity degree may be changed according to a situation where the captured image is obtained, for example, according to whether the vehicle is traveling in a mountainous area, an urban area, or on an expressway.

Basically, the representative image-capturing position calculation unit 56 calculates the representative image-capturing position that is the representative of the image-capturing positions of the plurality of the processing target captured images, by performing statistical processing on the image-capturing positions of the plurality of the processing target captured images. A method in which an arithmetic average value is calculated is generally employed as the statistical calculation method. However, in order to calculate the representative image-capturing position more accurately, it is preferable to employ a method in which a weighted average value is calculated using the position accuracy information.

When the representative image-capturing position is calculated based on the image-capturing positions of the set of the processing target data selected from the first processing group, the image-capturing positions with high accuracy reliability degrees constitute a population for the statistical calculation. Therefore, a simple statistical calculation value, such as the arithmetic average value or an intermediate value, may be used as the representative image-capturing position. In contrast, when the representative image-capturing position is calculated based on the image-capturing positions of the set of the processing target data selected from the second processing group, the image-capturing positions with relatively low accuracy reliability degrees constitute the population for the statistical calculation. Therefore, the statistical calculation value obtained taking variations into account, such as the weighted average value obtained using the position accuracy information, may be used as the representative image-capturing position.

Figure 6:
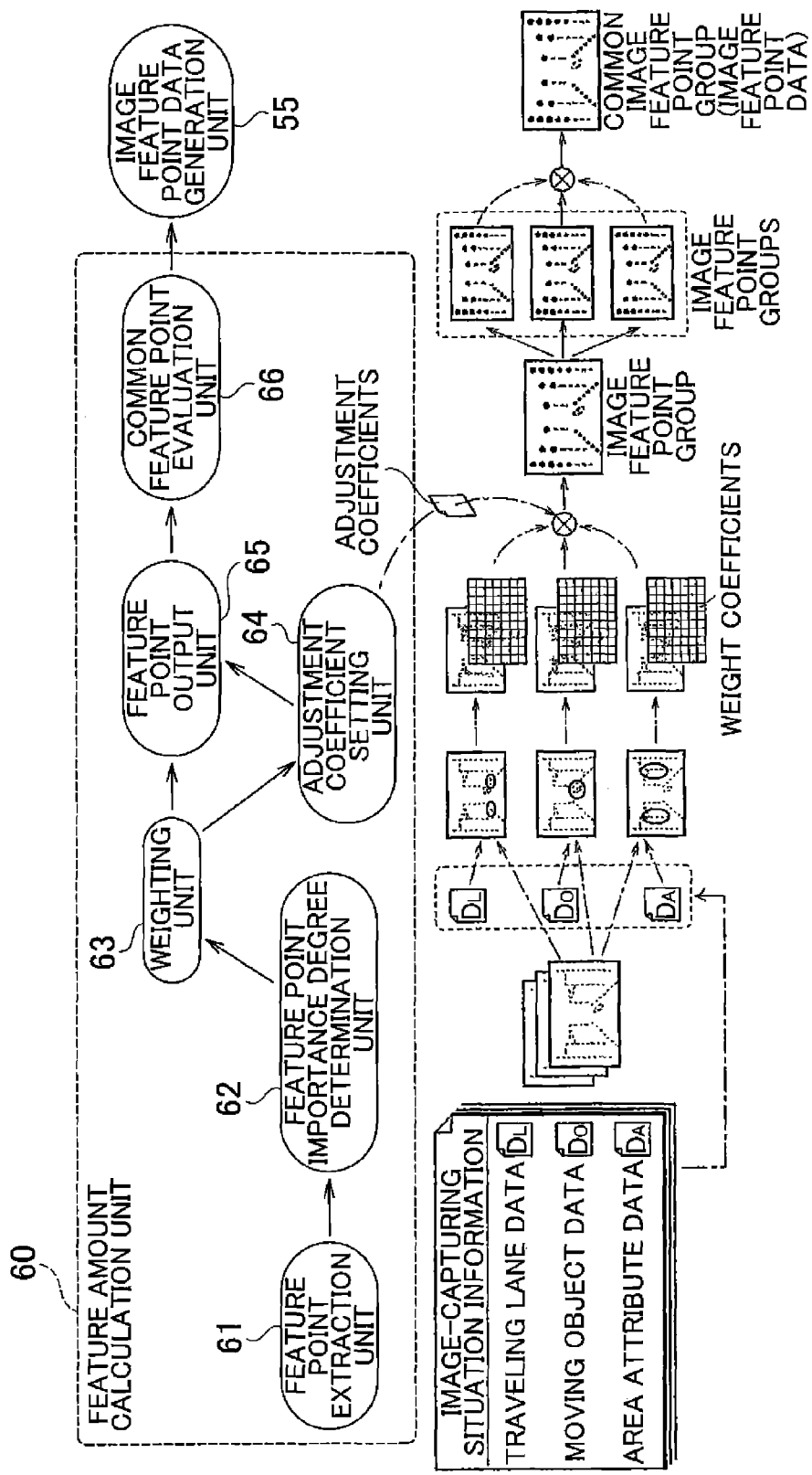
FIG. 6 is a schematic diagram showing processing functions of a feature amount calculation unit, and a processing flow.

As shown in FIG. 6, the feature amount calculation unit 60 includes a feature point extraction unit 61, a feature point importance degree determination unit 62, a weighting unit 63, an adjustment coefficient setting unit 64, a feature point output unit 65, and a common feature point evaluation unit 66. The feature point extraction unit 61 extracts the image feature points from the captured image using an appropriate outline (edge) detection operator. In this embodiment, the image feature points are edge points and edge point groups (edge lines). The feature point importance degree determination unit 62 determines the importance degrees of the image feature points extracted by the feature point extraction unit 61, based on the contents of each data included in the image-capturing situation information. For example, when the contents of the traveling lane data $D_L$ are used, a high importance degree is assigned to the image feature point in a road shoulder-side region outside the traveling lane in the captured image, as compared to an importance degree assigned to the image feature point in a region inside the traveling lane in the captured image. When the moving object data $D_O$ is used, a low importance degree is assigned to the image feature point in a region where a moving object exists in the captured image, as compared to an importance degree assigned to the image feature point in a region where the moving object does not exist in the captured image. Further, when the contents of the area attribute data $D_A$ are used, a rule for assigning the importance degrees to the image feature points in accordance with the positions of the image feature points in the captured image is changed in accordance with the above-described area attribute. For example, in the captured image of a mountainous area, because there is a high possibility that there is sky above a central optical axis for image capturing, and there are woods on the right and left sides of the central optical axis for image capturing, a high importance degree is assigned to the image feature point in a center region around the central optical axis for image capturing, as compared to an importance degree assigned to the image feature point in a region other than the central region. In the captured image of a suburban area, because there is not much traffic, and there are structural objects such as houses around, a high importance degree is assigned to the image feature point in a region below the central optical axis for image capturing, as compared to an importance degree assigned to the image feature point in a region above the central optical axis for image capturing. In the captured image of an urban area, because there is much traffic, a high importance degree is assigned to the image feature point in a region above the central optical axis for image capturing, as compared to a region below the central optical axis for image capturing. In the captured image of a high-rise building area, because there are many elevated roads and elevated bridges, a high importance degree is assigned to the image feature point in a region above the central optical axis for image capturing, as compared to a region below the central optical axis for image capturing.

The weighting unit 63 assigns weight coefficients to the image feature points in accordance with the importance degrees assigned by the feature point importance degree determination unit 62. Because a high importance degree is assigned to the image feature point that is considered to be important for performing accurate image recognition (accurate pattern matching), a high weight coefficient is assigned to the image feature point to which a high importance degree has been assigned. On the other hand, taking into account that there is a high possibility that the image feature point, to which a low importance degree has been assigned, is not used for the actual image recognition, or is deleted from the reference data, a low weight coefficient is assigned to the image feature point to which a low importance degree has been assigned so that the low weight coefficient is used for determining whether to select or delete the image feature point.

The adjustment coefficient setting unit 64 calculates adjustment coefficients used for changing the weight coefficients assigned by the weighting unit 63, in view of the distribution state of the weight coefficients in the captured image. The importance degrees, which have been assigned to the image feature points extracted by the feature point extraction unit 61 based on the image-capturing situation information, include certain errors. As a result, there is considered to be a possibility that the image feature points, to which high importance degrees have been assigned, are randomly distributed. Therefore, when the image feature points to which high importance degrees have been assigned are unevenly distributed, in other words, when the image feature points to which high weight coefficients have been assigned by the weighting unit 63 are unevenly distributed, the adjustment coefficient setting unit 64 is used to make the distribution less uneven. When the dispersion of the image feature points obtained through the computation processing indicates that the image feature points to which the high weight coefficients have been assigned are unevenly distributed, the adjustment coefficient is set to increase the weight coefficient(s) of the image feature points in a region where the density of the image feature points to which the high weight coefficients have been assigned is low, and the adjustment coefficient is set to decrease the weight coefficient(s) of the image feature points in a region where the density of the image feature points to which the high weight coefficients have been assigned is high. The feature point output unit 65 outputs the image feature point groups in each captured image by performing processing on the image feature points based on the weight coefficients assigned by the weighting unit 63, and adjustment coefficients that are optionally used.

The processing of distributing the image feature points in the edge point image over an entire region of the captured image as widely as possible using the above-described adjustment coefficients will be described with reference to a schematic explanatory diagram shown in FIGS. 7A to 7F. A feature point image (An edge detection image) (FIG. 7B) is generated by extracting the image feature points (the edge points) from the captured image (FIG. 7A). The importance degree is assigned to each edge point in the edge detection image. FIG. 7C shows the importance degrees corresponding to the edge points in the form of an importance degree layer corresponding to the edge detection image, in order to make it possible to schematically understand how the importance degrees are assigned. The weighting coefficient is assigned to each edge point using the importance degree layer. FIG. 7D shows the edge points to which the weight coefficients have been assigned, in the form of the edge detection image in which the size of the edge point increases as the weight coefficient of the edge point increases. If processing is performed on the edge points, for example, to delete the edge points to which the weight coefficients equal to or lower than the threshold value have been assigned, that is, for example, if the edge points other than the large-sized edge points in FIG. 7D are deleted, the edge points located in a lower region in the edge detection image are removed. As a result, the remaining edge points may be extremely unevenly distributed. In order to avoid the uneven distribution of the edge points in the image feature point data, the dispersion of the edge points in the edge detection image is calculated, and the adjustment coefficients are set to increase the weight coefficient(s) of the edge points in a region where the density of the remaining edge points is low as a result of performing processing on the edge points. In order to make it possible to schematically understand the adjustment coefficients that are set in the above-described manner, FIG. 7E shows groups of the adjustment coefficients in the form of an adjustment coefficient layer corresponding to the edge detection image. In the adjustment coefficient layer, the adjustment coefficients are arranged in a matrix manner (i.e., the adjustment coefficient is assigned to each section composed of a plurality of pixel regions). The feature point output unit 65 performs processing on the edge points using the weight coefficients and the weight coefficients that are finally set based on the adjustment coefficients, thereby generating the edge point image shown in FIG. 7F for each captured image.

The example, in which the importance degree of each image feature point is determined, and as a result, the weight coefficient of each image feature point is set, has been described above. However, the processing may be performed for each image feature point group. In this case, for example, the region of the captured image may be divided into a plurality of image sections, and the feature point importance degree determination unit 62 may divide the image feature points into image feature point groups so that each image feature point group includes the image feature points in the same image section, and may perform the processing for each image feature point group. In this case, the feature point importance degree determination unit 62 may assign the same importance degree to the image feature points included in the same image feature point group. Similarly, the weighting unit 63 may set the weight coefficient for each image feature point group. In this case, the image sections may be set in a manner such that each image section is composed of one pixel included in the captured image, or each image section is composed of a plurality of pixels.

The common feature point evaluation unit 66 generates the common image feature point group that is the representative of the image feature point groups, using the image feature point groups based on the captured images (the edge point groups in the edge point images), which are output by the feature point output unit 65. In the embodiment, the common feature point evaluation unit 66 generates the common image feature point group, by taking out the image feature points common to the captured images, from the image feature point groups based on the captured images. When treating the image feature point groups based on the processing target captured images selected from the first processing group, the image feature point groups in the selected processing target captured images are regarded as being similar to each other to a large extent, because the first image-capturing position region is a small region, and the accuracies of the image-capturing positions in the selected processing target captured images are high. When treating the image feature point groups based on the processing target captured images selected from the second processing group, although the second image-capturing position region is larger than the first image-capturing position region, the image feature point groups in the selected processing target captured images are regarded as being sufficiently similar to each other, because image similarity degrees of the selected processing target captured images are high. Thus, it is possible to generate the reference data that is highly reliable, by using the common image feature point group generated by the common feature point evaluation unit 66.

The image feature point data generation unit 55 generates the image feature point data based on the common image feature point group output from the feature amount calculation unit 60. The reference data generation unit 57 generates the reference data for the scene matching, by associating the image feature point data generated by the image feature point data generation unit 55 with the representative image-capturing position obtained by the representative image-capturing position calculation unit 56.

Figure 8:
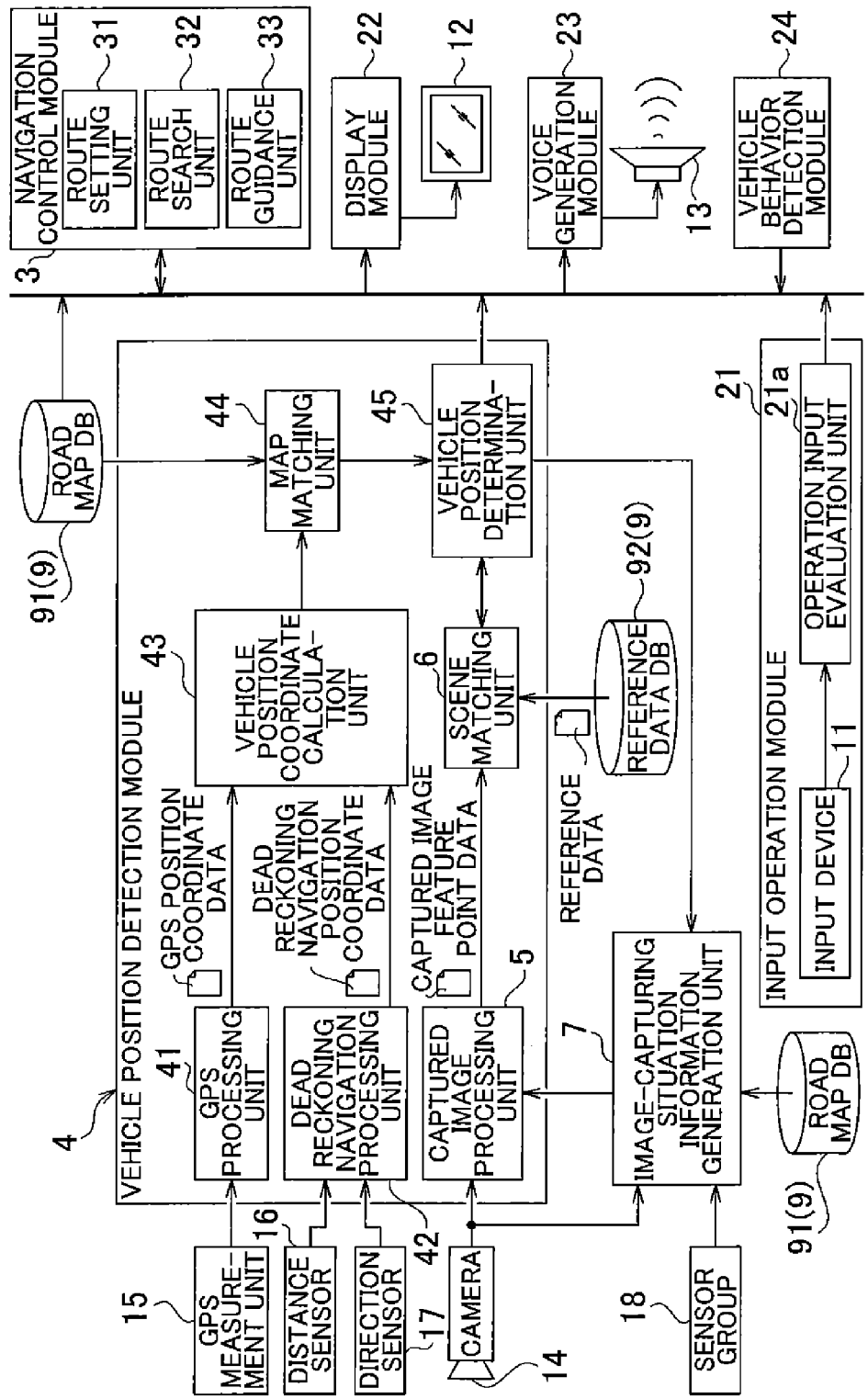
FIG. 8 shows functional blocks of a car navigation system using a reference data database created using the reference data generated by the scene matching reference data generation system according to the embodiment of the invention.

Next, a vehicle-mounted car navigation system, which corrects the vehicle position by performing the scenic image recognition (the image feature point pattern matching) using the reference data DB 92 created by the above-described image processing system, will be described. FIG. 8 shows functional blocks in an example in which the car navigation system is installed in a vehicle-mounted LAN. The car navigation system includes an input operation module 21, a navigation control module 3, a vehicle position detection module 4, an image-capturing situation information generation unit 7, and a database 9 including the above-described reference data DB 92 and a road map database (hereinafter, simply referred to as "road map DB") 91 in which road map data for car navigation is stored.

The navigation control module 3 includes a route setting unit 31, a route search unit 32, and a route guidance unit 33.

For example, the route setting unit 31 sets a departure point such as the current vehicle position, a destination that has been input, and pass-through points, and a traveling condition (for example, a condition as to whether an expressway is to be used). The route search unit 32 is a processing unit that performs computation processing for searching for a guidance route from the departure point to the destination based on the condition set by the route setting unit 31. The route guidance unit 33 is a processing unit that performs computation processing for providing appropriate route guidance to a driver in accordance with the route from the departure point to the destination, which is retrieved by the route search unit 32 as a result of searching. The route guidance unit 33 provides the route guidance, using guidance displayed on the screen of a monitor 12, voice guidance output from a speaker 13, and the like.

The vehicle position detection module 4 has a function of correcting the estimated vehicle position obtained by performing conventional position calculation using the GPS and performing conventional position calculation using dead reckoning navigation. The vehicle position detection module 4 corrects the estimated vehicle position based on the vehicle position determined by the scenic image recognition using the estimated vehicle position. The vehicle position detection module 4 includes a GPS processing unit 41, a dead reckoning navigation processing unit 42, a vehicle position coordinate calculation unit 43, a map matching unit 44, a vehicle position determination unit 45, a captured image processing unit 5, and a scene matching unit 6. The GPS processing unit 41 is connected to a GPS measurement unit 15 that receives GPS signals from GPS satellites. The GPS processing unit 41 analyzes the signals from the GPS satellites received by the GPS measurement unit 15, calculates the current position of the vehicle (i.e., the latitude and the longitude), and transmits the current position of the vehicle to the vehicle position coordinate calculation unit 43 as GPS position coordinate data. The dead reckoning navigation processing unit 42 is connected to a distance sensor 16 and a direction sensor 17. The distance sensor 16 is a sensor that detects the speed and the moving distance of the vehicle. For example, the distance sensor 16 includes a vehicle speed pulse sensor that outputs a pulse signal each time the drive shaft, the wheel, or the like of the vehicle rotates by a certain amount, a yaw rate/acceleration sensor that detects the acceleration of the vehicle, and a circuit that integrates the detected values of the acceleration. The distance sensor 16 outputs information on the speed of the vehicle and information on the moving distance of the vehicle, which are the results of detection, to the dead reckoning navigation processing unit 42. For example, the direction sensor 17 includes a gyro sensor, a geomagnetic sensor, an optical rotation sensor and a rotary variable resistor that are attached to the rotational unit of a steering wheel, and an angle sensor attached to a wheel unit. The direction sensor 17 outputs information on the direction, which is the result of detection, to the dead reckoning navigation processing unit 42. The dead reckoning navigation processing unit 42 computes dead reckoning navigation position coordinates based on the moving distance information and the direction information, which are transmitted to the dead reckoning navigation processing unit 42 at every moment, and transmits the computed dead reckoning navigation position coordinates to the vehicle position coordinate calculation unit 43 as the dead reckoning navigation position coordinate data. The vehicle position coordinate calculation unit 43 performs computation processing to determine the coordinates of the vehicle position based on the GPS position coordinate data and the dead reckoning navigation position coordinate data, using a known method.

The calculated vehicle position information includes a measurement error and the like. Therefore, the calculated vehicle position may deviate from a road in some cases. Thus, the map matching unit 44 adjusts the vehicle position information so that the vehicle is positioned on a road shown in the road map. The coordinates of the vehicle position are transmitted to the vehicle position determination unit 45 as the estimated vehicle position.

The captured image processing unit 5 includes functional units that are substantially the same as the feature amount calculation unit 60 and the image feature point data generation unit 55 shown in FIG. 6. The captured image processing unit 5 performs processing on the captured image of a scene ahead of the vehicle, which is obtained by the vehicle-mounted camera 14, and outputs the image feature point data according to the above-described procedure. The image-capturing situation information used for determining the importance degree of the feature point (edge point) is generated by an image-capturing situation information generation unit 7 provided in the vehicle, and is transmitted to the captured image processing unit 5. The image-capturing situation information generation unit 7 is connected to the vehicle-mounted camera 14 in order to generate the above-described traveling lane data $D_L$, and the image-capturing situation information generation unit 7 receives the captured image that is the same as the captured image transmitted to the captured image processing unit 5. The traveling lane data $D_L$ is created by performing image processing on the received captured image, using a known algorithm. The image-capturing situation information generation unit 7 is connected to a sensor group 18 for detecting an obstacle, in order to create the above-described moving object data $D_O$. The image-capturing situation information generation unit 7 creates the moving object data $D_O$ based on sensor information transmitted from the sensor group 18. Further, the image-capturing situation information generation unit 7 is connected to the vehicle position determination unit 45 and the database 9, in order to create the above-described area attribute data $D_A$. The image-capturing situation information generation unit 7 obtains the area attribute of an area where the vehicle is currently traveling, by searching the database 9 using the coordinates of the vehicle position transmitted from the vehicle position determination unit 45 as a search condition. Examples of the area attribute include a mountainous area and an urban area. The image-capturing situation information generation unit 7 creates the area attribute data $D_A$ based on the obtained area attribute.

The scene matching unit 6 performs the pattern matching processing on the image feature point data transmitted from the captured image processing unit 5, using, as the pattern, the reference data extracted from the reference data DB 92 based on the estimated vehicle position transmitted from the vehicle position determination unit 45. When the reference data matches the image feature point data, the image-capturing position associated with the matching reference data is retrieved. The retrieved image-capturing position is transmitted to the vehicle position determination unit 45, as the vehicle position. The vehicle position determination unit 45 corrects the vehicle position, that is, replaces the estimated vehicle position with the transmitted vehicle position.

The car navigation system further includes, as peripheral devices, an input operation module 21, a display module 22, a voice generation module 23, and a vehicle behavior detection module 24. The input operation module 21 includes an input device 11 including a touch panel and a switch; and an operation input evaluation unit 21a that transforms an operation input through the input device 11 to an appropriate operation signal, and transmits the operation signal to the car navigation system. The display module 22 causes the monitor 12 to display image information necessary for car navigation. The voice generation module 23 causes the speaker 13 and a buzzer to output voice information necessary for car navigation. The vehicle behavior detection module 24 detects various behaviors of the vehicle, such as a braking behavior, an accelerating behavior, and a steering behavior of the vehicle, based on behavior data transmitted through the vehicle-mounted LAN.

In order to obtain more reliable reference data, the image-capturing position associated with the reference data is required to be accurate. In the case where the reference data is generated based on the captured images and the image-capturing positions included in the set of probe data, even when the captured images with high accuracy reliability degrees are selected as the processing target captured images, the image-capturing positions (i.e., the vehicle positions calculated by the probe cars) may inevitably vary. In order to generate more reliable reference data even in the above-described case, it is preferable that the representative image-capturing position of the image-capturing positions of the plurality of the processing target captured images may be calculated by performing statistical processing on the image-capturing positions of the plurality of the processing target captured images, and the representative image-capturing position may be the image-capturing position associated with the reference data, that is, the representative image-capturing position may be a reference image-capturing position associated with the reference data, as in the above-described embodiment.

In order to efficiently evaluate the accuracy reliability degrees of the image-capturing positions, it is preferable that the reference data generation system may include the accuracy reliability degree table in which the accuracy reliability degrees of the image-capturing positions included in the set of the probe data are set according to information that indicates accuracies of the vehicle positions of the probe cars, and information that indicates travel situations in which the probe cars are traveling; and the accuracy reliability degrees of the captured images may be evaluated using the accuracy reliability degree table. Factors that greatly influence the accuracies of the image-capturing positions include the accuracies of the vehicle positions of the probe cars, and the travel situations in which the probe cars are traveling. Thus, it is possible to quickly and accurately evaluate the accuracy reliability degrees, by obtaining in advance the factors that change the accuracies of the image-capturing positions, and the degrees of change in the accuracies of the image-capturing positions, and creating and using the table based on the obtained factors and the obtained degrees of change in the accuracies of the image-capturing positions.

In order to efficiently evaluate the accuracy reliability degrees of the image-capturing positions, it is preferable that the set of the probe data should include a set of accuracy reliability degree data, which indicates the accuracy reliability degrees of the image-capturing positions; and the accuracy reliability degrees of the image-capturing positions of the captured images should be evaluated using the set of the accuracy reliability degree data. In this configuration, the set of the probe data includes the accuracy reliability degrees that are evaluated in advance, unlike the above-described configuration. Therefore, it is possible to easily evaluate the accuracy reliability degrees, and accordingly, it is possible to easily select the processing target captured images (the set of the processing target data), by reading the accuracy reliability degrees from the set of the obtained probe data.

It is preferable that image similarity degrees of the captured images stored in the temporary storage unit may be evaluated, and may be assigned to the captured images; and a plurality of the captured images with the image similarity degrees equal to or higher than a second predetermined degree may be selected, as the processing target captured images, from among the captured images stored in the temporary storage unit. In this configuration, for example, when the accuracy reliability degrees of the image-capturing positions in the set of the obtained probe data are low on average, it is possible to evaluate the image similarity degrees of the captured images, instead of the accuracy reliability degrees of the image-capturing positions, and to select the captured images with high image similarity degrees as the processing target captured images (the set of the processing target data). There is a high possibility that the captured images with high image similarity degrees have been obtained at the same image-capturing position. Therefore, the image feature point data is generated by selecting the captured images with high image similarity degrees as the processing target captured images, and calculating the image feature amounts. Further, the representative image-capturing position is obtained by performing, for example, statistical processing on the image-capturing positions of the processing target captured images. Then, the reference data is generated by associating the generated image feature point data with the obtained representative image-capturing position. Thus, it is possible to obtain the reference data that includes the highly reliable image feature point data and the highly reliable image-capturing position, even when the image-capturing positions in the set of the probe data greatly vary.

In order to effectively use the selection of the processing target captured images based on the accuracy reliability degrees and the selection of the processing target captured images based on the image similarity degrees, it is preferable that when the number of the captured images with the accuracy reliability degrees equal to or higher than a third predetermined degree among the captured images stored in the temporary storage unit is equal to or smaller than a predetermined value, the mode may be switched from the accuracy reliability degree mode in which the processing target captured images are selected based on the accuracy reliability degrees, to the image similarity degree mode in which the processing target captured images are selected based on the image similarity degrees. Thus, it is possible to select and use the appropriate mode according to the number of the captured images with relatively high accuracy reliability degrees.

Another Embodiment

In the above-described embodiment, the representative image-capturing position associated with the reference data is obtained by performing the statistical processing on the image-capturing positions of the plurality of the processing target captured images. However, depending on the manner in which the processing groups are set, that is, the manner in which the size of the first image-capturing position region and the size of the second image-capturing position region are set, the representative image-capturing position may be determined in advance when the processing groups are set, that is, when the size of the first image-capturing position region and the size of the second image-capturing position region are set. Alternatively, after the representative image-capturing position is determined, the size of the first image-capturing position region and the size of the second image-capturing position region may be set.

In the above-described embodiment, among the edge points obtained as the image feature points through the edge detection processing, particularly, the line segment edge points that constitute one line segment, and the corner edge point are treated as the useful image feature points. The corner edge point (the intersection edge point) corresponds to the intersection at which the line segments intersect with each other, preferably, the line segments are substantially orthogonal to each other. However, the image feature points used in the invention are not limited to such edge points. The image feature points useful for a scene may be used. For example, the typical edge points that form a geometric shape, such as a circle and a rectangle, may be used (when the geometric shape is a circle, the typical edge points may be three points on the circumference of the circle), or the gravity center of a geometric shape or a point indicating the gravity center of the geometric shape in the image may be used. Also, it is preferable to employ an edge intensity as a factor used for calculating the importance degree. For example, when a line segment is composed of an edge with a high intensity, the starting point and the ending point of the line segment may be treated as the image feature points to which a high importance degree is assigned, as compared to an importance degree assigned to the edge points other than the starting point and the ending point. Also, specific points in a characteristic geometric shape, for example, edge points and the point indicating the gravity center in a symmetrical object may be treated as the image feature points to which a high importance degree is assigned, as compared to an importance degree assigned to the edge points other than the end points.

Further, in addition to the edge points obtained through the edge detection processing, a point at which a hue and/or a chroma greatly change(s) in the captured image may be employed as the image feature point. Similarly, as the image feature point based on color information, the edge point of an object with a high color temperature may be treated as the image feature point with a high importance degree.

That is, any image feature points may be used in the invention, as long as the image feature points are useful for the determination as to the degree of similarity between the reference data and the image feature point data generated based on the actually-captured image, for example, the pattern matching.

In the above-described embodiment, the reference data stored in the reference data DB 92 is associated with the representative image capturing position. The reference data may be associated with the image-capturing direction (the direction of the optical axis of the camera), the above-described image-capturing situation information, a date on which the image is captured, a weather at the time of image capturing, and the like, in addition to the image-capturing position and the image-capturing direction.

The image-capturing position needs to be indicated by at least two-dimensional data such as data including the latitude and the longitude. The image-capturing position may be indicated by three-dimensional data including the latitude, the longitude, and the altitude.

The image-capturing direction does not necessarily need to be associated with the reference data. For example, in the case where it is ensured that when the reference data is created, the image is captured in a direction with respect to a road on which the vehicle is traveling, which is substantially the same as a direction in which the image is captured when the scenic image recognition is performed using the reference data, the image-capturing direction does not need to be associated with the reference data.

In the case where the image-capturing direction is associated with the reference data, and a plurality of reference data may be prepared by appropriately changing the image-capturing direction from one basic image-capturing direction, the direction in which the vehicle is traveling may be calculated based on information transmitted from the direction sensor and the like, and only the reference data, whose image-capturing direction coincides with the direction in which the vehicle is traveling, may be used for the scenic image recognition.

The most appropriate vehicle-mounted camera used in the invention is a camera that captures an image of a scene ahead of the vehicle in the direction in which the vehicle is traveling. However, the vehicle-mounted camera may be a camera that captures an image of a scene at a position obliquely ahead of the vehicle, or a camera that captures an image of a scene on the side of the vehicle, or an image of a scene behind the vehicle. That is, the captured image used in the invention is not limited to an image of a scene ahead of the vehicle in the direction in which the vehicle is traveling.

In the functional block diagram used to describe the above embodiment, the functional units are separated from each other so that the description is easily understandable. However, the invention is not limited to the case where the functional units are separated from each other as shown in the functional block diagram. At least two of the functional units may be freely combined with each other, and/or one functional unit may be further divided.

The image processing system according to the invention may be applied not only to car navigation, but also to a technical field in which the current position and the current direction are measured through the scenic image recognition.

What is claimed is:

1. A scene matching reference data generation system comprising:
    a data input unit to which a set of probe data is input, wherein the set of the probe data includes captured images sequentially obtained by a plurality of probe cars each of which has a function of calculating a vehicle position, and the vehicle positions of the probe cars, as image-capturing positions of the captured images;
    a temporary storage unit in which the captured images included in the set of the probe data are temporarily stored;
    an accuracy reliability degree evaluation unit that evaluates accuracy reliability degrees of the image-capturing positions of the captured images stored in the temporary storage unit, and assigns the accuracy reliability degrees to the captured images;
    a processing target data selection unit that selects, as a plurality of processing target captured images, a plurality of the captured images with the accuracy reliability degrees equal to or higher than a first predetermined degree, from among the captured images stored in the temporary storage unit;
    an image feature point data generation unit that extracts image feature points from the plurality of the processing target captured images, and generate image feature point data based on the image feature points extracted from the plurality of the processing target captured images; and
    a reference data generation unit that generates the reference data used for scene matching to recognize an image of a scene viewed from a vehicle, by associating the image feature point data with a reference image-capturing position corresponding to the image feature point data.

2. The scene matching reference data generation system according to claim 1, wherein
    the image feature point data generation unit generates the image feature point data by performing statistical processing on the image feature points extracted from the plurality of the processing target captured images.

3. The scene matching reference data generation system according to claim 1, wherein
the image feature point data generation unit extracts common image feature points that are the image feature points common to the plurality of the processing target captured images, and generates the image feature point data using the common image feature points.

4. The scene matching reference data generation system according to claim 1, further comprising
a representative image-capturing position calculation unit that calculates a representative image-capturing position that is a representative of the image-capturing positions of the plurality of the processing target captured images, by performing statistical processing on the image-capturing positions of the plurality of the processing target captured images, wherein
the reference image-capturing position is the representative image-capturing position.

5. The scene matching reference data generation system according to claim 1, further comprising
an accuracy reliability degree table in which the accuracy reliability degrees of the image-capturing positions included in the set of the probe data are set according to information that indicates accuracies of the vehicle positions of the probe cars, and information that indicates travel situations in which the probe cars are traveling, wherein
the accuracy reliability degree evaluation unit evaluates the accuracy reliability degrees using the accuracy reliability degree table.

6. The scene matching reference data generation system according to claim 1, wherein
the set of the probe data includes a set of accuracy reliability degree data, which indicates the accuracy reliability degrees of the image-capturing positions; and
the accuracy reliability degree evaluation unit evaluates the accuracy reliability degrees using the set of the accuracy reliability degree data.

7. The scene matching reference data generation system according to claim 1, further comprising
an image similarity degree evaluation unit that evaluates image similarity degrees of the captured images stored in the temporary storage unit, and assigns the image similarity degrees to the captured images, wherein
the processing target data selection unit selects, as the plurality of the processing target captured images, a plurality of the captured images with the image similarity degrees equal to or higher than a second predetermined degree, from among the captured images stored in the temporary storage unit.

8. The scene matching reference data generation system according to claim 7, wherein
when a number of the captured images with the accuracy reliability degrees equal to or higher than a third predetermined degree among the captured images stored in the temporary storage unit is equal to or smaller than a predetermined value, a mode of the processing target data selection unit is switched from an accuracy reliability degree mode in which the processing target captured images are selected based on the accuracy reliability degrees, to an image similarity mode in which the processing target captured images are selected based on the image similarity degrees.

9. A position measurement system comprising
a reference data database in which the reference data generated by the scene matching reference data generation system according to claim 1 is stored;
a captured image processing unit that extracts image feature points from a captured image obtained by capturing an image of a scene viewed from a vehicle, generates image feature point data for each captured image using the extracted image feature points, and outputs the generated image feature point data as data for matching; and
a scene matching unit that performs matching between the reference data extracted from the reference data database and the data for matching, and determines a position of the vehicle based on the image-capturing position associated with the reference data that matches the data for matching.

* * * * *